United States Patent
Williamson et al.

(10) Patent No.: US 11,036,666 B2
(45) Date of Patent: Jun. 15, 2021

(54) ASYNCHRONOUS MAPPING OF HOT-PLUGGED DEVICE ASSOCIATED WITH VIRTUAL MACHINE

(71) Applicant: Red Hat Israel, Ltd., Raanana (IL)

(72) Inventors: Alex Williamson, Fort Collins, CO (US); Michael Tsirkin, Lexington, MA (US)

(73) Assignee: Red Hat Israel, Ltd., Raanana (IL)

( * ) Notice: Subject to any disclaimer, the term of this patent is extended or adjusted under 35 U.S.C. 154(b) by 50 days.

(21) Appl. No.: 16/653,222

(22) Filed: Oct. 15, 2019

(65) Prior Publication Data

US 2020/0042485 A1    Feb. 6, 2020

Related U.S. Application Data

(60) Division of application No. 15/962,265, filed on Apr. 25, 2018, now Pat. No. 10,474,616, which is a continuation of application No. 14/844,995, filed on Sep. 3, 2015, now Pat. No. 9,996,494.

(51) Int. Cl.
*G06F 13/00* (2006.01)
*G06F 13/40* (2006.01)
*G06F 9/455* (2018.01)

(52) U.S. Cl.
CPC ...... *G06F 13/4081* (2013.01); *G06F 9/45558* (2013.01); *G06F 2009/45579* (2013.01)

(58) Field of Classification Search
CPC ...... G06F 13/00; G06F 13/40; G06F 9/45558; G06F 2009/45579
See application file for complete search history.

(56) References Cited

U.S. PATENT DOCUMENTS

| | | | |
|---|---|---|---|
| 8,453,143 B2 | 5/2013 | Mahalingam et al. | |
| 8,521,912 B2* | 8/2013 | Aloni | G06F 13/102 709/250 |
| 8,607,013 B2 | 12/2013 | Chen et al. | |
| 8,631,284 B2 | 1/2014 | Stevens | |
| 8,719,817 B2 | 5/2014 | Aswani et al. | |
| 8,954,959 B2* | 2/2015 | Tsirkin | G06F 12/1009 718/1 |

(Continued)

OTHER PUBLICATIONS

Manolis Marasakis, "I/O in Linux Hypervisors and Virtual Machines Lecture for the Embeded Systems Course", Institute of Computer Science (ICS); Foundation for Research and Technology—Hellas (FORTH), May 8-10, 2014, 78 pages http://www.csd.uoc.gr/~hy428/reading/vmio_may8_2014.pdf.

(Continued)

*Primary Examiner* — David E Martinez
(74) *Attorney, Agent, or Firm* — Lowenstein Sandler LLP

(57) ABSTRACT

Systems and methods for asynchronous mapping of a hot-plugged I/O device associated with a virtual machine. An example method comprises: executing, by a host computer system, a virtual machine managed by a hypervisor, wherein the virtual machine is associated with a hot-pluggable input/output (I/O) device; responsive to detecting removal of the I/O device, unpin a memory buffer associated with the I/O device; and responsive to receiving a signal indicating completion of unpinning the memory buffer, release the I/O device from the hypervisor.

20 Claims, 5 Drawing Sheets

(56) References Cited

U.S. PATENT DOCUMENTS

| | | | |
|---|---|---|---|
| 2007/0177611 A1* | 8/2007 | Armstrong | G06F 21/53 370/395.52 |
| 2008/0027564 A1* | 1/2008 | Duron | G06F 11/2005 700/1 |
| 2008/0133709 A1 | 6/2008 | Aloni et al. | |
| 2008/0189715 A1 | 8/2008 | Armstrong et al. | |
| 2012/0072906 A1 | 3/2012 | Tsirkin et al. | |
| 2013/0091500 A1 | 4/2013 | Earl et al. | |
| 2013/0254321 A1 | 9/2013 | Johnsen et al. | |
| 2015/0012654 A1 | 1/2015 | Derrin et al. | |

OTHER PUBLICATIONS

Nadav, Amit, "Alleviating Virtualization Bottlenecks", Research Thesis, Israel Institute of Technology, Haifa, IL, Mar. 2014, 137 pages http://assaf.net.technion.ac/il/files2013/01/Nadav-Amit-Disseration.pdf.

Santos, Jose Renato et al., "Bridging the Gap Between Software and Hardware Techniques for I/O Virtualization", usenix.org. 23 pages https://www.usenix.org/legacy/event/usenix08/tech/full_papers/santos/santos_html/ (Last accessed Jun. 19, 2015).

Tu, Cheng-Chun et al., "A Comprehensive Implementation and Evaluation of Direct Interrupt Deliver", VEE/15, Mar. 14-15, Istanbul, Turkey, 15 pages http://compass.cs.stonybrook/edu/~mferdman/downloads.php/VEE15_Comprehensive-Implementation_and_Evaluation_of_direct_Interrupt_Delivery.pdf.

"Libvirt:Domain XML format" libvirt.org, 47 pages https://libvirt.org/formatdomain.html (Last accessed Jun. 19, 2015).

USPTO, Office Action for U.S. Appl. No. 14/844,995, dated Jun. 19, 2017.

USPTO, Final Office Action for U.S. Appl. No. 14/844,995, dated Nov. 29, 2017.

USPTO, Notice of Allowance for U.S. Appl. No. 14/844,995, dated Feb. 2, 2018.

USPTO, Office Action for U.S. Appl. No. 15/62,265, dated Mar. 19, 2019.

USPTO, Notice of Allowance for U.S. Appl. No. 15/62,265, dated Jun. 25, 2019.

* cited by examiner

ASYNCHRONOUS MAPPING OF HOT-PLUGGED DEVICE ASSOCIATED WITH VIRTUAL MACHINE

RELATED APPLICATIONS

This application is a divisional of U.S. patent application Ser. No. 15/962,265 filed on Apr. 25, 2018, which is a continuation of U.S. patent application Ser. No. 14/844,995 filed on Sep. 3, 2015. Both above-referenced applications are incorporated by reference herein.

TECHNICAL FIELD

The present disclosure is generally related to virtualized computer systems, and is more specifically related to systems and methods for facilitating Direct Memory Access (DMA) operations.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
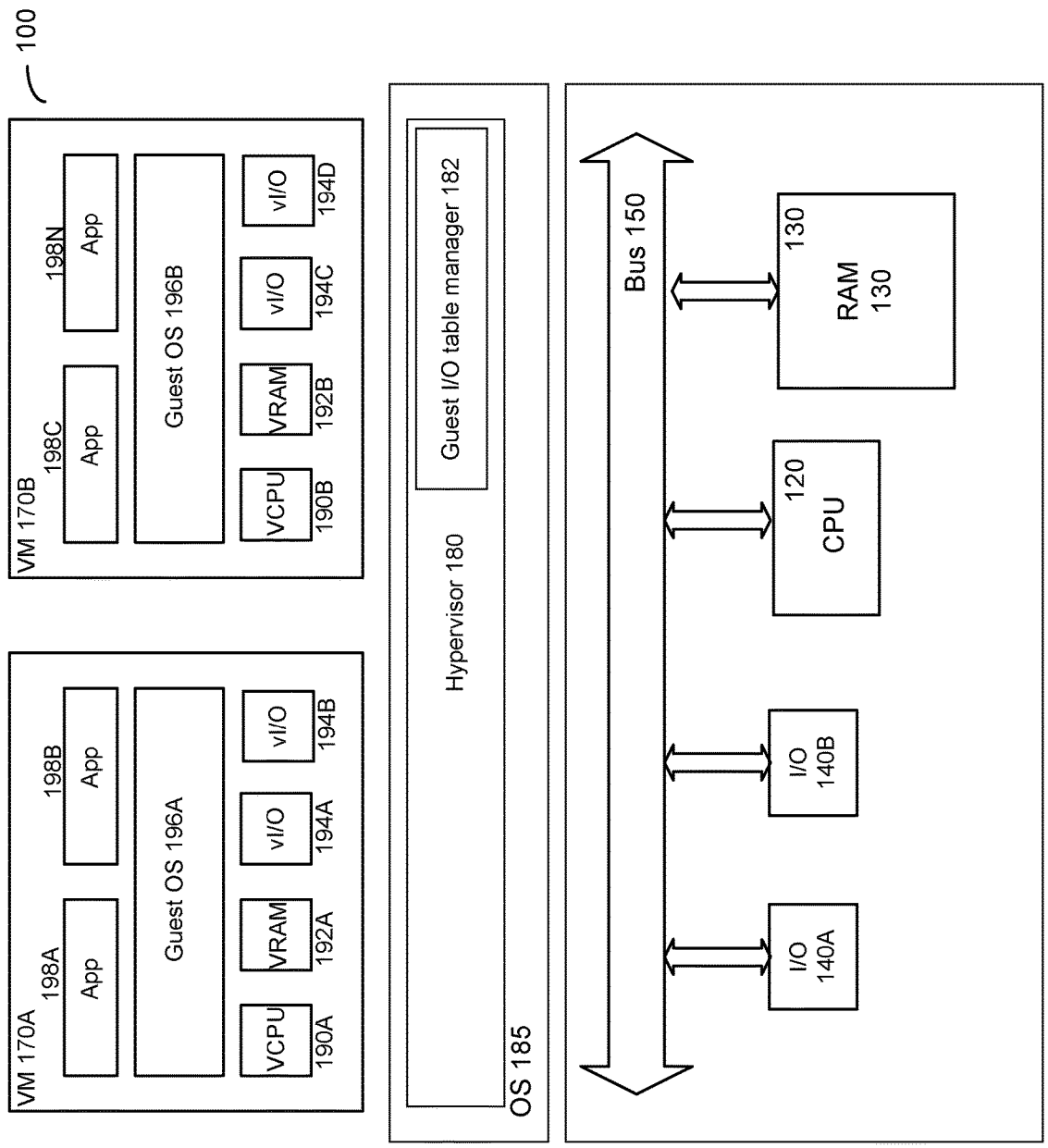
FIG. 1 depicts a high-level component diagram of an example computer system implementing the methods for asynchronous mapping of a hot-plugged I/O device associated with a virtual machine, in accordance with one or more aspects of the present disclosure.

Described herein are methods and systems for asynchronous mapping of a hot-plugged I/O device associated with a virtual machine.

A host computer system may support a virtual memory environment in which the memory space of a virtual machine may be divided into memory pages that may be allocated in the host RAM and swapped to a backing storage when necessary.

Direct Memory Access (DMA) herein refers to a method allowing an I/O device to access the system memory directly, while bypassing the central processing unit (CPU). I/O devices that are capable of performing DMA include disk drive controllers, graphics cards, network interface cards, sound cards, etc. In certain implementations, the host computer system may emulate DMA to allow virtual I/O devices to access the guest memory directly, while bypassing the guest central processing units (vCPUs). The guest memory buffer associated with a DMA-capable I/O device should reside in a pinned host memory. Pinned memory page herein refers to a memory page which cannot be relocated to a different physical memory location (e.g., swapped to the backing storage or relocated to a different physical memory page in the system memory).

A hypervisor running on the host computer system may emulate a guest I/O table (e.g., a guest IOMMU) to manage address translations for DMA-enabled virtual I/O devices. Each entry of the guest I/O table may map an I/O device identifier (comprising an I/O bus identifier and a device address) to a guest physical address of the memory buffer that has been allocated to the device by the guest operating system. In various illustrative examples, each guest I/O table entry may further comprise access permissions associated with the memory buffer.

In certain implementations, hot-plugging a physical I/O device to a virtual machine or removal of a previously assigned I/O device from a virtual machine may lead to a stall in the virtual machine due to the overhead of the hypervisor pinning (on hot-plug) or un-pinning (on removal) the memory buffer associated with the I/O device and initializing (on hot-plug) or destroying (on removal) the IOMMU mapping associated with the I/O device. The duration of the stall may be proportional to the size of the memory buffer and the overhead of the pinning and mapping operations, which may approach, but never reach, zero.

Aspects of the present disclosure address the above noted and other deficiencies by providing methods and systems for asynchronous mapping of a hot-plugged I/O device associated with a virtual machine. In accordance with one or more aspects of the present disclosure, the virtual machine stall caused by hot-plugging or removal of I/O devices may be eliminated by implementing a multi-threaded model, in which the memory pinning and IOMMU mapping are performed asynchronously with respect to the execution of the virtual processors, so that the virtual machines may enjoy continuous execution during these pinning and mapping operations. On I/O device hot-plugging, the I/O device would only become visible to the virtual machine after the completion of the memory pinning and IOMMU mapping operations, which may be signaled to the hypervisor by the respective threads. On I/O device removal, the I/O device may be removed from the virtual machine, but would only be released from the hypervisor upon receiving the completion notifications of the un-mapping and un-pinning threads.

Various aspects of the above referenced methods and systems are described in details herein below by way of examples, rather than by way of limitation.

FIG. 1 depicts a high-level component diagram of an illustrative example of a computer system 100 operating in accordance with one or more aspects of the present disclosure. Computer system 100 may include one or more processors 120 communicatively coupled to memory devices 130 and input/output (I/O) devices 140 via a system bus 150.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

Computer system 100 may run one or more virtual machines 170A-170B, by executing a software layer 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors, memory, and I/O devices, and present this abstraction to virtual machines 170A-170B as virtual devices. A virtual machine 170 may execute a guest operating system 196 which may utilize underlying virtual processors (also referred to as virtual central processing units (vCPUs)) 190, virtual memory 192, and virtual I/O devices 194. One or more applications 198A-198N may be running on a virtual machine 170 under a guest operating system 196.

In various illustrative examples, processor virtualization may be implemented by the hypervisor scheduling time slots on one or more physical processors for a virtual machine, rather than a virtual machine actually having a dedicated physical processor. Device virtualization may be implemented by intercepting virtual machine memory read/write and/or input/output (I/O) operations with respect to certain memory and/or I/O port ranges, and by routing hardware interrupts to a virtual machine associated with the corresponding virtual device. Memory virtualization may be implementing by a paging mechanism allocating the host RAM to virtual machine memory pages and swapping the memory pages to a backing storage when necessary. Computer system 100 may support a virtual memory environment in which a virtual machine address space is simulated with a smaller amount of the host random access memory (RAM) and a backing storage (e.g., a file on a disk or a raw storage device), thus allowing the host to over-commit the memory. The virtual machine memory space may be divided into memory pages which may be allocated in the host RAM and swapped to the backing storage when necessary. The guest operating system may maintain a page directory and a set of page tables to keep track of the memory pages. When a virtual machine attempts to access a memory page, it may use the page directory and page tables to translate the virtual address into a physical address. If the page being accessed is not currently in the host RAM, a page-fault exception may be generated, responsive to which the host computer system may read the page from the backing storage and continue executing the virtual machine that caused the exception.

In certain implementations, the host computer system may emulate Direct Memory Access (DMA) to allow virtual I/O devices to access the guest memory directly, while bypassing the guest central processing units (CPUs). A hypervisor running on the host computer system may emulate a guest I/O table (e.g., a guest IOMMU) to manage address translations for DMA-enabled virtual I/O devices. The guest IOMMU may map an I/O device identifier (comprising an I/O bus identifier and a device address) to a guest physical address of the memory buffer that has been allocated to the device by the guest operating system.

Guest I/O table manager component 182 running on host computer system 100 may perform various DMA functions in accordance with one or more aspects of the present disclosure. In certain implementations, guest I/O table manager component 182 may be implemented as a software component invoked by hypervisor 180. Alternatively, functions of guest I/O table manager component 182 may be performed by hypervisor 180.

Figure 2:
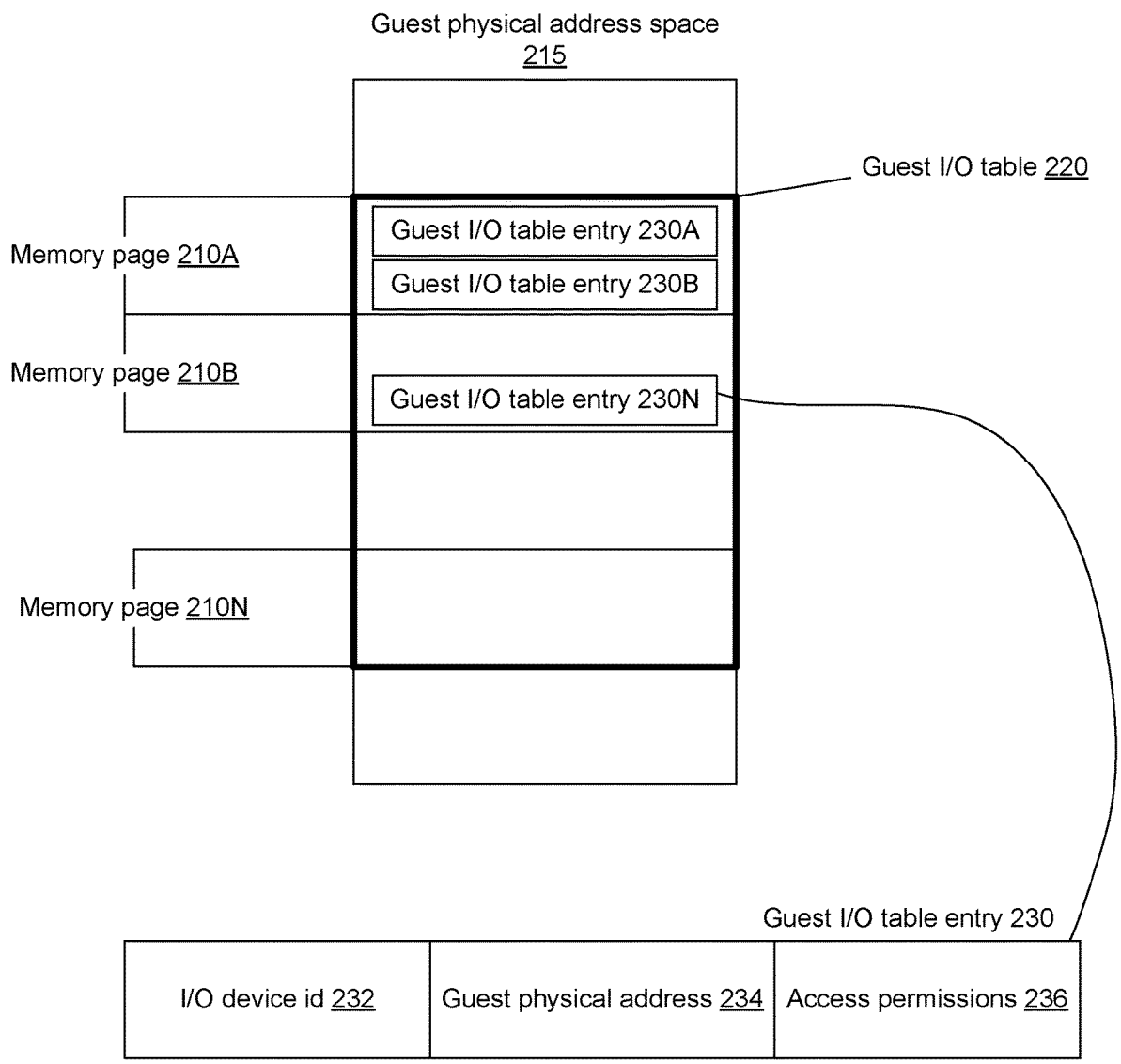
FIG. 2 schematically illustrates an example of guest I/O table, in accordance with one or more aspects of the present disclosure.

FIG. 2 schematically illustrates an example of guest I/O table, in accordance with one or more aspects of the present disclosure. As schematically illustrated by FIG. 2, the hypervisor may allocate a plurality of memory pages 210A-210N residing in the guest memory 215 to store a guest I/O table 220. In an illustrative example, guest I/O table 220 may be represented by an emulated IOMMU. Guest I/O tables may comprise a plurality of I/O table entries 230A-230N. A guest table entry 230 may map an I/O device identifier 232 to a guest physical address 234 of the buffer associated with the I/O device. In certain implementations, I/O device identifier 232 may comprise an I/O bus identifier and a device address on the bus. In certain implementations, guest table entry 230 may further comprise access permissions 236 associated with the memory buffer.

As noted herein above, hot-plugging a physical I/O device to a virtual machine or removal of a previously assigned I/O device from a virtual machine may lead to a stall in the virtual machine due to the overhead of the hypervisor pinning (on hot-plug) or un-pinning (on removal) the memory buffer associated with the I/O device and initializing (on hot-plug) or destroying (on removal) the IOMMU mapping associated with the I/O device. The duration of the stall may be proportional to the size of the memory buffer and the overhead of the pinning and mapping operations, which may approach, but never reach, zero.

In accordance with one or more aspects of the present disclosure, the virtual machine stall caused by hot-plugging or removal of I/O devices may be eliminated by implementing a multi-threaded model, in which the memory pinning and IOMMU mapping are performed asynchronously with respect to the execution of the virtual processors, so that the virtual machines may enjoy continuous execution during these pinning and mapping operations.

In an illustrative example, one or more virtual processors assigned to a virtual machine may be executed by a first processing thread, while the memory pinning and IOMMU mapping operations may be performed asynchronously with respect to executing the virtual processors, by a second processing thread (in certain implementations, the memory pinning and IOMMU mapping operations may be executed by two separate processing threads). The respective processing threads may be programmed to signal the completion of the pinning and IOMMU mapping operations to the hypervisor (e.g., via a signal, socket, pipe, shared memory, or any other suitable means of inter-process communication).

On I/O device hot-plugging, the I/O device would only become visible to the virtual machine after the completion of the memory pinning and IOMMU mapping operations, which may be signaled to the hypervisor by the respective processing threads performing the IOMMU mapping and memory pinning.

On I/O device removal, the I/O device may be removed from the virtual machine, but would only be released from the hypervisor upon receiving the completion notifications of the respective processing threads destroying the IOMMU mapping and performing the memory un-pinning.

Figure 3:
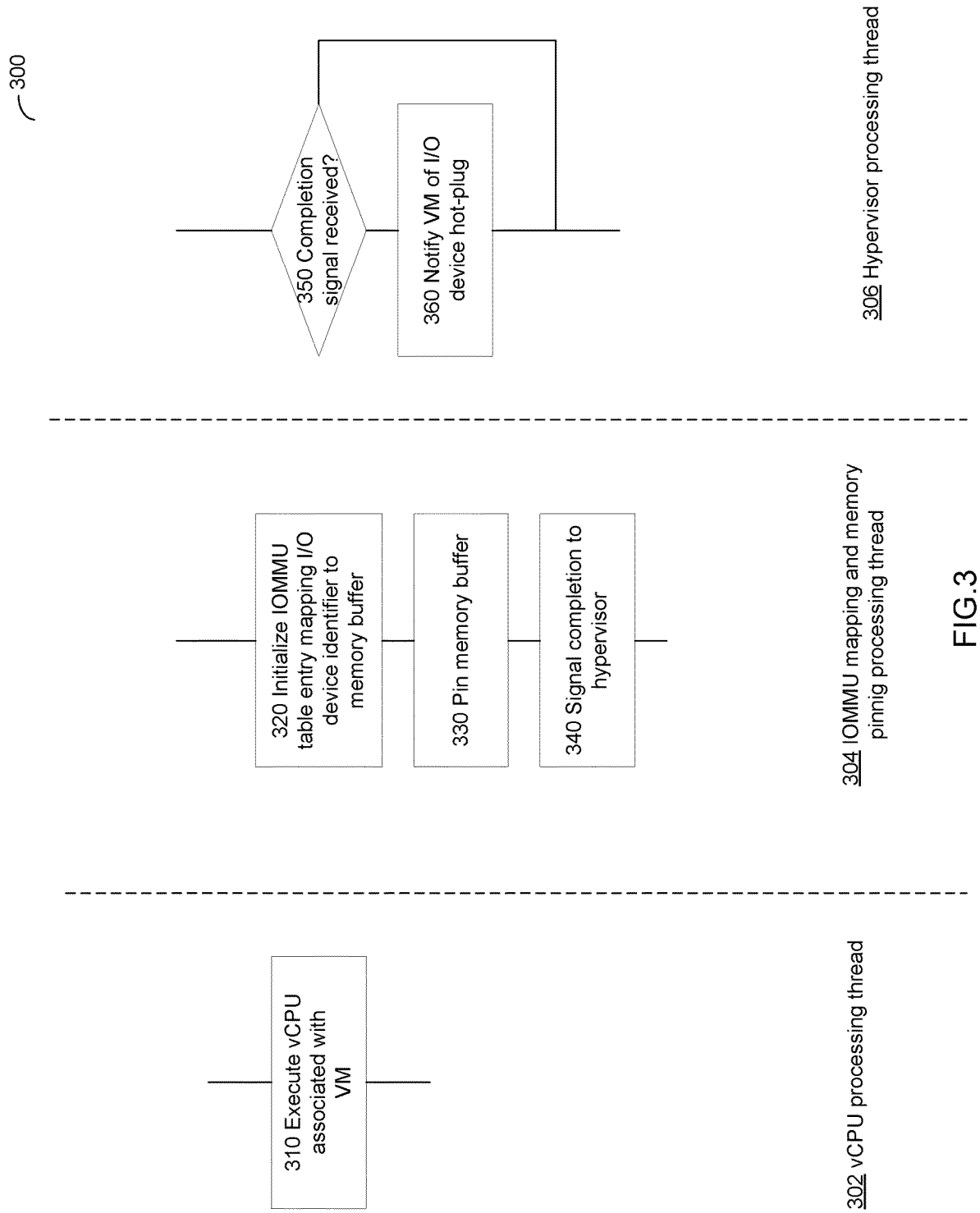
FIG. 3 depicts a flow diagram of a method for asynchronous mapping of a hot-plugged I/O device associated with a virtual machine, in accordance with one or more aspects of the present disclosure.

FIG. 3 depicts a flow diagram of one illustrative example of method 300 for asynchronous mapping of a hot-plugged I/O device associated with a virtual machine, in accordance with one or more aspects of the present disclosure. Method 300 and/or each of its individual functions, routines, subroutines, or operations may be performed by one or more processing devices of the computer system (e.g., host computer system 100 of FIG. 1) implementing the method. In certain implementations, method 300 may be performed by several processing threads, e.g., processing thread 302 executing a virtual processor associated with a virtual machine, processing thread 304 performing IOMMU mapping and memory pinning operations, and processing thread 306 executing the hypervisor. In certain implementations, IOMMU mapping and memory pinning operations may be performed by two separate processing threads. Each processing thread may execute one or more individual functions, routines, subroutines, or operations of the method. In certain implementations, the processing threads implementing method 300 may be executed asynchronously with respect to each other.

Processing thread 302 may execute a virtual processor associated with a virtual machine running on a host computer system, as schematically illustrated by block 310.

Processing thread 304 may perform IOMMU mapping and memory pinning operations. At block 320, the processing thread may initialize a table entry of a guest input/output (I/O) table associated with the virtual machine to map a device identifier of the I/O device to a memory buffer associated with the I/O device. In certain implementations, the guest I/O table may be represented by an emulated guest IOMMU. The memory address may be represented by a guest physical address within the address space of the virtual machine. The I/O device identifier may comprise a bus identifier and/or a device bus address, as described in more details herein above.

At block 330, processing thread 304 may pin the memory buffer associated with the I/O device.

At block 340, processing thread 304 may signal (e.g., via a signal, socket, pipe, shared memory, or any other suitable means of inter-process communication) the completion of the IOMMU mapping and memory pinning operations to processing thread 306 executing the hypervisor.

Processing thread 306 may execute the hypervisor running on the host computer system. Responsive to receiving, at block 350, a completion signal from processing thread 304, processing thread 306 may, at block 360, notify the virtual machine of the I/O device being hot-plugged.

Figure 4:
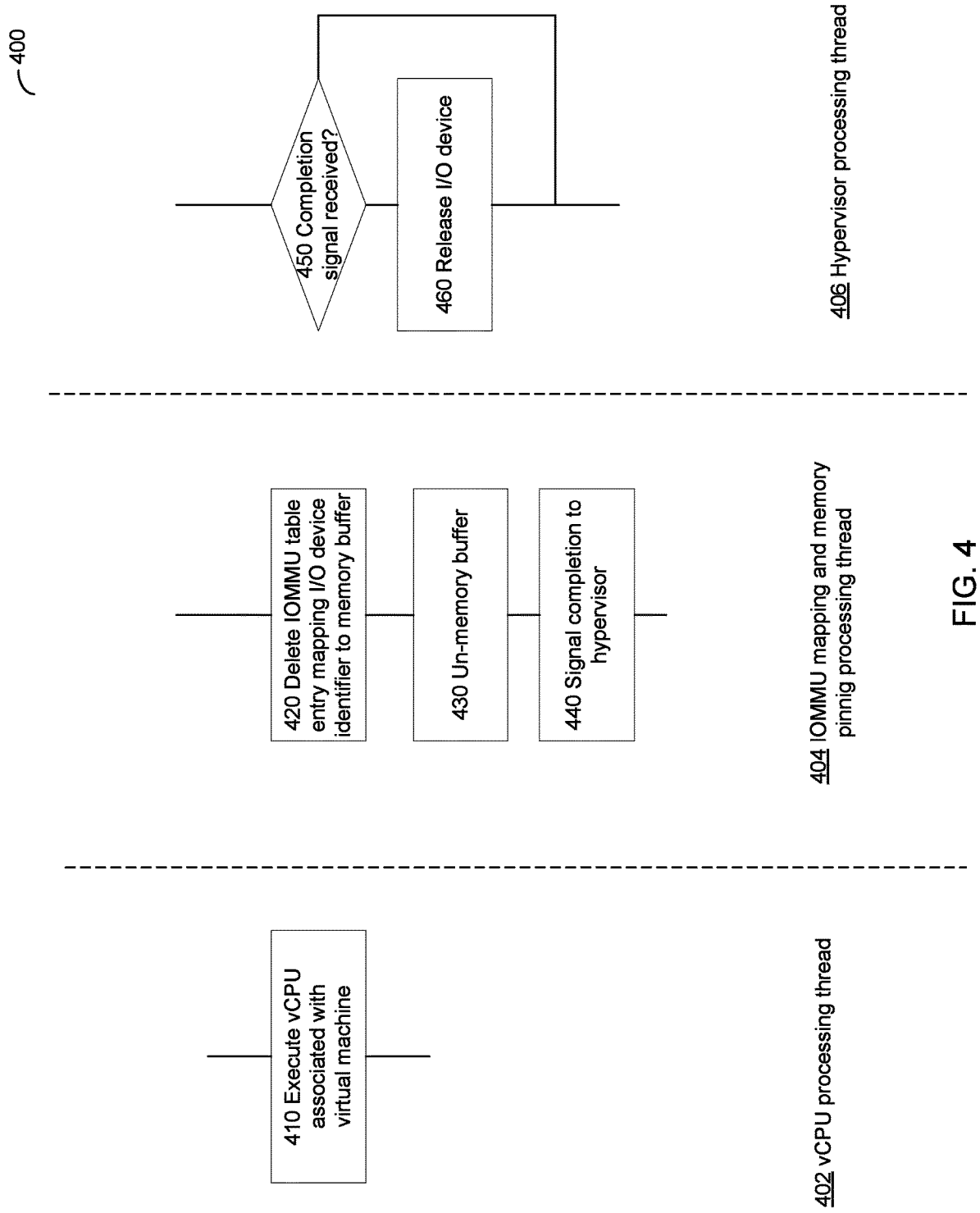
FIG. 4 depicts a flow diagram of a method for asynchronous removal of an I/O device associated with a virtual machine, in accordance with one or more aspects of the present disclosure.

FIG. 4 depicts a flow diagram of one illustrative example of method 400 for asynchronous removal of an I/O device associated with a virtual machine, in accordance with one or more aspects of the present disclosure. Method 400 and/or each of its individual functions, routines, subroutines, or operations may be performed by one or more processing devices of the computer system (e.g., host computer system 100 of FIG. 1) implementing the method. In certain implementations, method 400 may be performed by several processing threads, e.g., processing thread 402 executing a virtual processor associated with a virtual machine, processing thread 404 performing IOMMU mapping and memory pinning operations, and processing thread 406 executing the hypervisor. In certain implementations, IOMMU mapping and memory pinning operations may be performed by two separate processing threads. Each processing thread may execute one or more individual functions, routines, subroutines, or operations of the method. In certain implementations, the processing threads implementing method 400 may be executed asynchronously with respect to each other.

Processing thread 402 may execute a virtual processor associated with a virtual machine running on a host computer system, as schematically illustrated by block 410.

Processing thread 404 may perform IOMMU mapping and memory pinning operations. At block 420, the processing thread may delete (or otherwise render non-functional) a table entry of a guest input/output (I/O) table associated with the virtual machine to map a device identifier of the I/O device to a memory buffer associated with the I/O device.

At block 430, processing thread 404 may un-pin the memory buffer associated with the I/O device.

At block 440, processing thread 404 may signal (e.g., via a signal, socket, pipe, shared memory, or any other suitable means of inter-process communication) the completion of the IOMMU mapping and memory pinning operations to processing thread 406 executing the hypervisor.

Processing thread 406 may execute the hypervisor running on the host computer system. Responsive to receiving, at block 450, a completion signal from processing thread 404, processing thread 406 may, at block 460, release the /O device.

Figure 5:
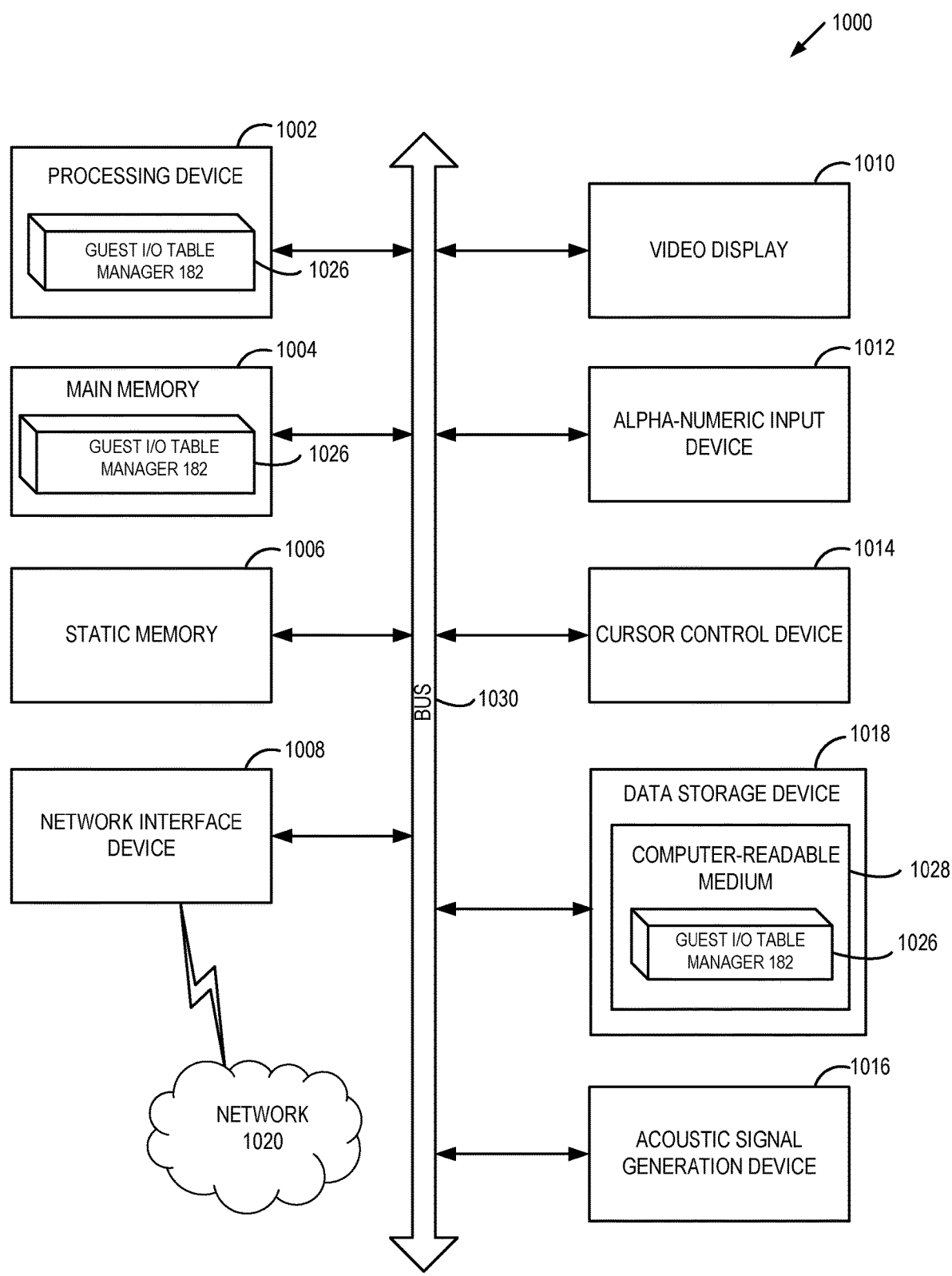
FIG. 5 depicts a block diagram of an example computer system operating in accordance with one or more aspects of the present disclosure.

FIG. 5 schematically illustrates a component diagram of an example computer system 1000 which can perform any one or more of the methods described herein. In various illustrative examples, computer system 1000 may represent host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute guest I/O table manager component 182 implementing method 300 for asynchronous mapping of a hot-plugged I/O device associated with a virtual machine and/or method 400 for asynchronous removal of an I/O device associated with a virtual machine.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of guest I/O table manager component 182 implementing method 300 for asynchronous mapping of a hot-plugged I/O device associated with a virtual machine and/or method 400 for asynchronous removal of an I/O device associated with a virtual machine.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
executing, by a host computer system, a virtual machine managed by a hypervisor, wherein the virtual machine is associated with a hot-pluggable input/output (I/O) device;
responsive to detecting removal of the hot-pluggable I/O device, unpinning a memory buffer associated with the hot-pluggable I/O device; and
responsive to receiving a signal indicating completion of unpinning the memory buffer, releasing the hot-pluggable I/O device from the hypervisor.

2. The method of claim 1, wherein unpinning the memory buffer is performed asynchronously with respect to executing the virtual machine.

3. The method of claim 1, wherein executing the virtual machine is performed by a first processing thread and unpinning the memory buffer is performed by a second processing thread.

4. The method of claim 1, further comprising:
maintaining an I/O table associated with the virtual machine to emulate direct memory access (DMA) for the hot-pluggable I/O device to directly access a memory of the virtual machine, wherein the I/O table comprises a table entry mapping an identifier of the hot-pluggable I/O device to an address of the memory buffer.

5. The method of claim 4, wherein the table entry comprises access permissions associated with the memory buffer.

6. The method of claim 1, further comprising:
deleting, from an I/O table associated with the virtual machine, a table entry mapping an identifier of the hot-pluggable I/O device to an address of the memory buffer, wherein the I/O table emulates direct memory access (DMA) for the hot-pluggable I/O device to directly access a memory of the virtual machine.

7. The method of claim 6, wherein the I/O table is represented by an Input/Output Memory Management Unit (IOMMU) table.

8. The method of claim 6, wherein the identifier of the hot-pluggable I/O device comprises at least one of: a bus identifier or a bus address.

9. The method of claim 1, wherein unpinning the memory buffer further comprises:
rendering the memory buffer swappable to a backing storage.

10. A system comprising:
a memory; and
a processing device, operatively coupled to the memory, to:
execute a virtual machine managed by a hypervisor, wherein the virtual machine is associated with a hot-pluggable input/output (I/O) device;
responsive to detecting removal of the hot-pluggable I/O device, unpin a memory buffer associated with the hot-pluggable I/O device; and
responsive to receiving a signal indicating completion of unpinning the memory buffer, release the hot-pluggable I/O device from the hypervisor.

11. The system of claim 10, wherein executing the virtual machine is performed by a first processing thread and unpinning the memory buffer is performed by a second processing thread.

12. The system of claim 10, wherein the processing device is further to:
delete, from an I/O table associated with the virtual machine, a table entry mapping an identifier of the hot-pluggable I/O device to an address of the memory buffer, wherein the I/O table emulates direct memory access (DMA) for the hot-pluggable I/O device to directly access a memory of the virtual machine.

13. The system of claim 12, wherein the I/O table is represented by an Input/Output Memory Management Unit (IOMMU) table.

14. The system of claim 10, wherein unpinning the memory buffer further comprises:
rendering the memory buffer swappable to a backing storage.

15. A computer-readable non-transitory storage medium comprising executable instructions to cause a processing device to:
execute a virtual machine managed by a hypervisor, wherein the virtual machine is associated with a hot-pluggable input/output (I/O) device;
responsive to detecting removal of the hot-pluggable I/O device, unpin a memory buffer associated with the hot-pluggable I/O device; and
responsive to receiving a signal indicating completion of unpinning the memory buffer, release the hot-pluggable I/O device from the hypervisor.

16. The computer-readable non-transitory storage medium of claim 15, wherein unpinning the memory buffer is performed asynchronously with respect to executing the virtual machine.

17. The computer-readable non-transitory storage medium of claim 15, wherein executing the virtual machine is performed by a first processing thread and unpinning the memory buffer is performed by a second processing thread.

18. The computer-readable non-transitory storage medium of claim 15, wherein the processing device is further to:
delete, from an I/O table associated with the virtual machine, a table entry mapping an identifier of the hot-pluggable I/O device to an address of the memory buffer, wherein the I/O table emulates direct memory access (DMA) for the hot-pluggable I/O device to directly access a memory of the virtual machine.

19. The computer-readable non-transitory storage medium of claim 18, wherein the I/O table is represented by an Input/Output Memory Management Unit (IOMMU) table.

20. The computer-readable non-transitory storage medium of claim 15, wherein unpinning the memory buffer further comprises:
rendering the memory buffer swappable to a backing storage.

* * * * *